United States Patent [19]
Killer

[11] 3,874,535
[45] Apr. 1, 1975

[54] MECHANICAL BOAT LOADING DEVICE

[76] Inventor: James Donald Killer, 4480 Wilson Rd., Yarrow, British Columbia, Canada

[22] Filed: Dec. 26, 1973

[21] Appl. No.: 428,429

[52] U.S. Cl. .............................. 214/450, 296/23 B
[51] Int. Cl. .............................................. B60m 9/00
[58] Field of Search .................. 214/450; 296/23 B; 224/42.03 R, 42.07, 42.08, 42.1 R, 42.1 H

[56] References Cited
UNITED STATES PATENTS

| | | | |
|---|---|---|---|
| 2,982,431 | 5/1961 | Moody | 224/42.03 R |
| 3,128,893 | 4/1964 | Jones | 214/450 |
| 3,343,696 | 9/1967 | Morrison | 214/450 |
| 3,495,729 | 2/1970 | Kruse | 214/450 |
| 3,762,587 | 10/1973 | Longee | 214/450 |
| 3,777,922 | 12/1973 | Kirchmeyer | 214/450 |

*Primary Examiner*—Albert J. Makay
*Assistant Examiner*—Jerold M. Forsberg
*Attorney, Agent, or Firm*—Stanley G. Ade

[57] ABSTRACT

Due to the height of motor homes, trailers, vans, campers and the like, it is difficult to raise a boat such as a car-top type boat, to a position whereby it can be placed on the roof of the vehicle for transportation, and several winch systems have been devised to facilitate this. However, they are usually custom-built and suitable for one type of vehicle only and in any event, it is often difficult to secure the boat to the elevation device particularly if the boat is relatively heavy. The present device is securable to the frame of the vehicle and is fully adjustable as to size. It includes a hinged boat platform, which can be held level with the top of the boat for ease in securing the boat thereof to the platform by the gunwales of the boat, and includes means to secure the outboard motor also. Winch means are provided to elevate the attached boat onto the top of the vehicle and to lower same to the ground when it is desired to unload the boat from the vehicle.

8 Claims, 4 Drawing Figures

3,874,535

MECHANICAL BOAT LOADING DEVICE

BACKGROUND OF THE INVENTION

This invention relates to new and useful improvements in elevating devices to assist in the movement of a car-top type boat from the ground, to the upper roof surface of a motor home, van, camper, trailer or the like. Due to the height of such vehicles, it is difficult to manipulate the boat into position and although several elevating devices have been designed to facilitate this, nevertheless they are not satisfactory for various reasons.

SUMMARY OF THE INVENTION

The present invention overcomes disadvantages inherent with current facilities by providing a fully adjustable hinged main frame which in turn is provided with a hinged boat clamping frame on one end thereof which can be adjusted so that boat clamping frame lies across the gunwales of the boat when the boat is at the side of the vehicle and resting upon the ground.

A winch is provided which then hinges the boat clamping frame together with the boat substantially at right angles to the main frame and then winches the main frame vertically so that it lies substantially parallel to the side of the vehicle at which time the boat frame and boat are lying upon the upper surface of the vehicle and can be secured thereto for transportation purposes.

When it is desired to unload the boat, the reverse action takes place with the winch lowering the boat to the ground engaging position so that it is ready for use.

The principal object and essence of the invention is therefore to provide a device of the character herewithin described which can be secured to a vehicle and which facilitates the loading and unloading of a boat upon the upper roof surface thereof.

Another object of the invention is to provide a device of the character herewithin described which is adjustable so that one type of construction will suit several vehicles.

Another object of the invention is to provide a device of the character herewithin described in which the boat clamping frame is adapted to lie horizontal when in the boat attaching position thus facilitating the attachment of the boat to the boat clamping frame.

A still further object of the invention is to provide a device of the character herewithin described which includes means to limit the angular relationship of the boat clamping frame and the main frame thus facilitating the action of the device.

A still further object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement of parts and construction of parts all as hereinafter more particularly described, reference being had to the accompanying drawings in which:

BRIEF DESCRIPTION OF THE DRAWINGS

FIG. 1 is an isometric view of the device showing same attached to a motor home or the like.

In the drawings like characters of reference indicate corresponding parts in the different figures.

DETAILED DESCRIPTION

Figure 1:
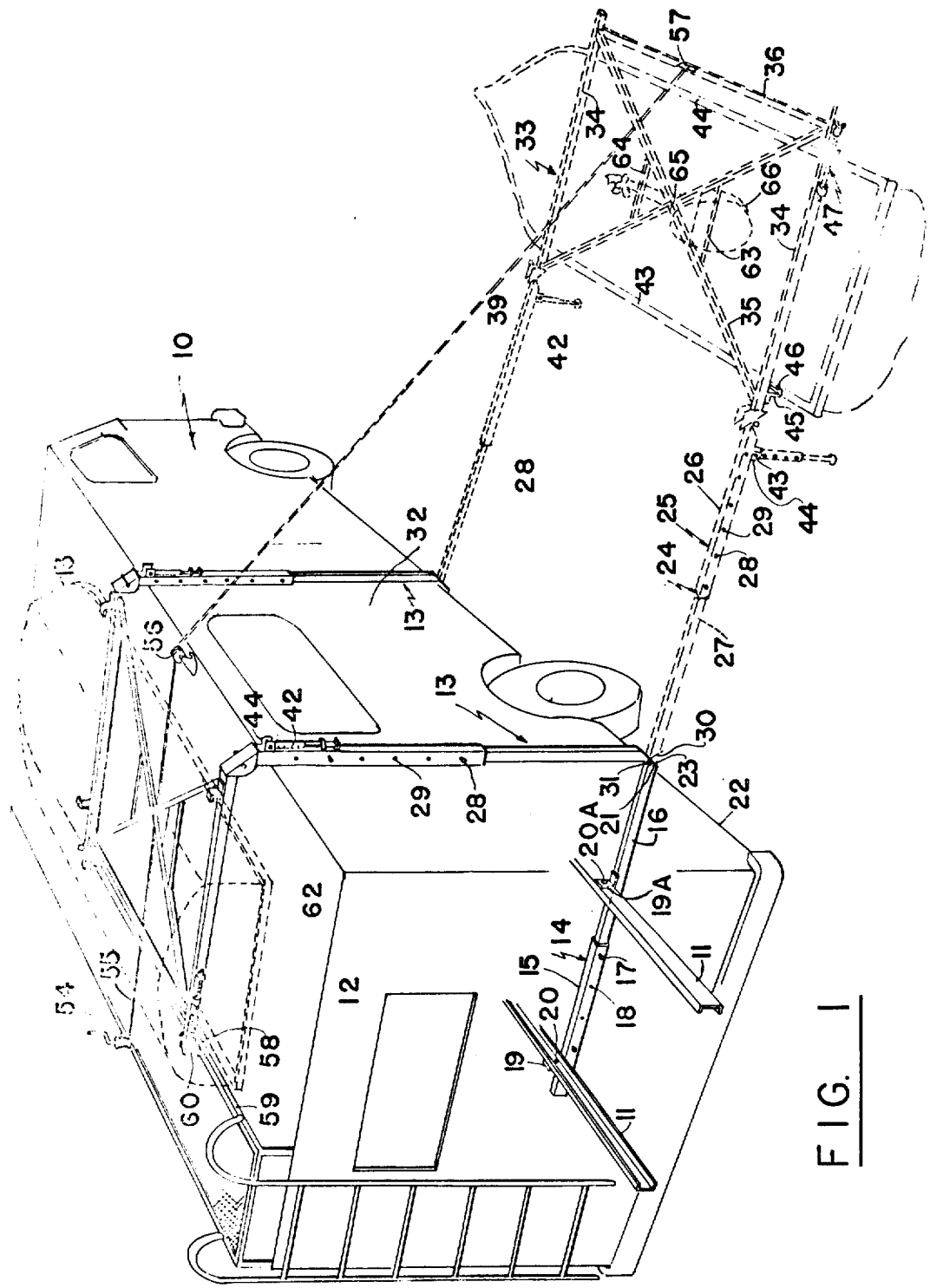

Proceeding therefore to describe the invention in detail, reference character 10 illustrates generally a motor home or the like which includes a pair of spaced and parallel longitudinally extending members 11 which, in this instance, constitute part of the chassis of the vehicle.

Similar longitudinally extending supports are present on travel trailers and also upon truck or van campers, it being understood that the present device can be attached to any such vehicle if desired.

Whichever vehicle is used, it includes a substantially planar upper roof surface 12 upon which the associated boat 13 is stored in an upside down position, for transportation purposes.

The device collectively designated 13 consists of means for attaching same to the vehicle designated generally by reference character 14.

In the present embodiment, this comprises a pair of spaced and parallel tubular members 15 (one only of which is shown) together with further members 16 telescopically engaging within members 15 and being secured in the desired relationship one with the other, by means of bolts 17 extending through apertures 18 formed therethrough as clearly illustrated in FIG. 1.

Members 15 include a bracket or flange 19 welded to member 15 and adapted to be attached to one of the longitudinal frame members 11, by means of nut and bolt assembly 20.

A similar bracket or flange 19A is welded to the upper surface of the member 16 and similarly attaches to the other longitudinal member 11 by means of nut and bolt assembly 20A, clearly shown in FIG. 1.

The members 16 are adjusted so that the outer ends 21 are adjacent the longitudinal lower corner 22 of the vehicle and these ends 21 are cut at an angle and one plate 23 of a butt hinge assembly is secured to this end 21 as by welding or the like. However, it will be appreciated that other forms of hinging means can be used if desired.

A main frame collectively designated 24 is provided and consists of a pair of spaced and parallel assemblies collectively designated 25, each assembly includes an outer square cross section tube 26 and an inner square cross section tube 27 telescopically engaging within the tube 26 and being held in the desired relationship by means of nut and bolt assemblies 28 extending through apertures 29 in the usual way.

The inner ends of the tubes 27 are also cut at an angle and the other plate 30 of the hinge 21 is secured as by welding or other similar means, to this inner end as clearly illustrated in FIG. 1 and hinge pin 31 joins the two plates 23 and 30 together to form a hinge connection of the main frame to the support means 14. This arrangement permits the main frame to be hinged to a substantially horizontal position shown in phantom in FIG. 1 or to be hinged upwardly to lie parallel to and continguous with the vertical side 32 of the vehicle as shown in full line in FIG. 1.

A boat clamping frame collectively designated 33 is in turn hinged to the outer ends of the main frame 24 and this boat clamping frame includes a pair of spaced and parallel members 34 together with diagonal brace members 35 and longitudinally extending members 36 thus making a substantially rectangular framework braced with the diagonals 35.

Figure 2:
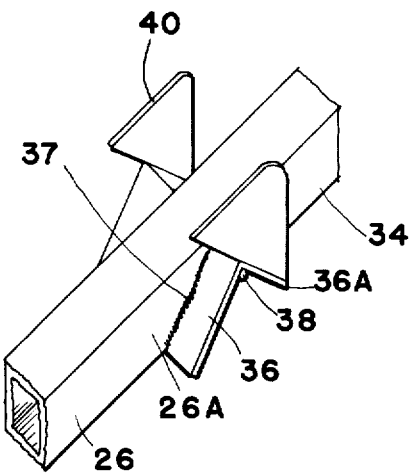
FIG. 2 is an enlarged fragmentary isometric view of the hinged connection between the main frame and the boat clamping frame in the horizontal position.
Figure 3:
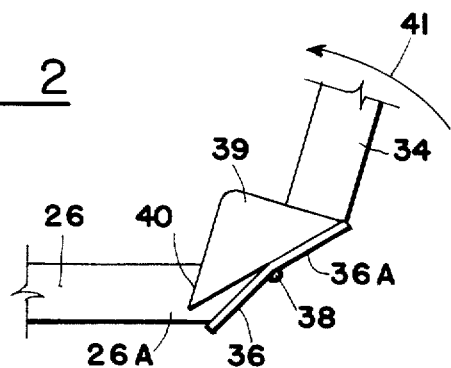
FIG. 3 is an enlarged fragmentary side elevation of FIG. 2, but showing the boat clamping frame approaching the 90° position.

The inner ends of the transver members 34 are in turn hinged to the outer ends of the main frame members 25 and details of this hinged connection are shown in FIGS. 2 and 3.

The outer ends of the tubes 26 are cut at an angle and the inner ends (not illustrated) of the transverse members 34 are also cut at an angle and the flat plates 36 and 36A of a hinge assembly are secured to these angulated ends as by welding 37 or the like with a hinge pin 38 joining the two plates 36 and 36A as clearly illustrated in the drawings.

A pair of fish plates 39 are welded to the sides of the transverse members 34 and to the hinge plates 36A with the ends or extremities 40 extending beyond the hinge pin 38.

This means that when the boat clamping frame 33 is moved upwardly in the direction of arrow 41 (see FIG. 3), these ends 40 engage the extending sides of the plate 36 thus limiting the angular relationship of the boat clamping frame to the main frame. When in the boat loading position shown in FIG. 1 in phantom, the boat clamping frame is at a 180° angle with the main frame, but when in the elevating position, the boat clamping frame lies at 90° to the plane of the main frame with this 90° angle being limited by the engagement of the extremities 40 of the fish plates with the extending sides of the hinge plate 36. FIG. 2 shows the relationship with the two frames at approximately 180° relationship one with the other whereas FIG. 3 shows the relationship as the boat clamping frame approaches the 90° relationship with the main frame.

Adjustable jack assemblies 42 are hingedly secured to the undersides of the square tubes 26 adjacent the hinge connection with the boat clamping frame 33 and these are provided to position the outer sides of the main frame at a height from the ground so that the boat clamping frame is easily engaged upon the gunwales 43 and 44 of the boat when in the position shown in phantom in FIG. 1.

These adjustable jacks are conventional in construction and are hinged to the tubes 26 by means of hinge pins 43 and brackets 44.

Means are provided to detachably clamp the boat clamping frame 33 to the boat 13 and take the form of gunwale engaging clips or lugs 45 secured adjacent the inner ends of the transverse members 34 of the boat clamping frame and these lugs are provided with horizontal portions 46 (with reference to the phantom view in FIG. 1) which engage under the gunwale 43.

Figure 4:
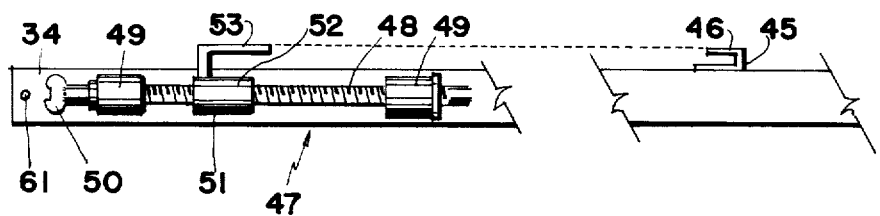
FIG. 4 is an enlarged fragmentary side elevation of one of the boat clamping frame clamp assemblies.

Adjustable gunwale clamp assemblies 47 are provided adjacent the outer ends of the transverse members 34 and FIG. 4 shows the construction of the present embodiment.

A screw-threaded rod 48 is rotatable within bearing 49 secured to the side of the transverse members 34 and a wing nut 50 is secured to one end of the rod so that the rod can be rotated within the bearings 49.

A travelling clamp component 51 includes a screw threaded barrel engageable upon the rod 48, and a lug 53 secured to the barrel 52 which is adapted to engage under the other gunwale 44 of the boat when the boat clamping frame is in the position shown in FIG. 1.

By engaging the gunwale 43 with the clamps or lugs 45, the movable clamps 51 may then be engaged under the other gunwale 44 thus clamping the boat firmly to the boat clamping frame by the gunwales.

A winch assembly 54 is provided upon the roof surface of the vehicle and this may be manually operated or, alternatively, electrically operated if this is desired.

It includes a cable 55 extending from the winch drum, over a pulley assembly 56 adjacent the junction between the roof surface 12 and the vertical side 32 and then extending to an anchoring point 57 upon the outermost longitudinal member 36 of the boat clamping frame as shown in phantom in FIG. 1.

In operation, the boat clamping frame is secured to the gunwales 43 and 44 of the boat as hereinbefore described whereupon the winch 54 is operated to wind the cable 55. This raises the boat clamping frame 33 together with the boat 13 to the vertical position wherein the frame 33 lies at 90° to the main frame 24 and is maintained in this position by the stop means in the form of the fish plates 39 as hereinbefore described. Further rotation of the winch assembly then elevates the main frame together with the boat clamping frame and boat, to the position where the main frame lies parallel to the vertical side 32 of the vehicle and the boat clamping frame together with the boat secured thereto, lies parallel with the roof surface 12.

In this connection, the outer ends of the boat clamping frame transverse members 34 engage within pairs of brackets 58 supported upon a member 59 secured to the roof surface 12 and detachable pin means 60 may engage through the brackets and through apertures 61 within members 34 thus maintaining the device in the transport position with the boat in an upside down position resting upon the boat clamping frame as clearly shown in FIG. 1.

In order to unload the boat, the pins 60 are withdrawn and the cable 55 is slackened thus allowing the assembly to be moved outwardly in the direction of arrow 62 until the center of gravity passes beyond the vertical position at which time the device may be lowered to the position shown in phantom in FIG. 1, by unwinding the winch 54.

Finally, reference should be made to a wooden cross member 63 extending between the diagonal 35 and clamp member 64 upon the opposite side of the intersection 65 of the diagonal member. This permits an outboard motor 66 to be clamped thereto for storage and transportation purposes.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A boat loading and unloading device for vehicles such as mobile homes, trailers, vans, campers and the like which include longitudinally extending support means such as a chassis frame and a substantially planar upper roof surface; comprising in combination means to attach the device to the vehicle frame, a main frame hingedly secured by one end thereof to one end of said means and adapted to hinge from a horizontal boat loading position to a vertical position whereby said main frame lies parallel to and contiguous with one side wall of said vehicle, a boat clamping frame hingedly secured to the other end of said main frame, means co-acting between said boat clamping frame and said main frame to limit the hinging relationship therebetween, and means on said clamp frame to detachably secure the associated boat thereto, said means co-acting between said boat clamping frame and said main frame including at least one stop means adjacent the hinge connection of said boat clamping frame to said main frame thereby limiting the angular relationship between said frames from between substantially 180° to substantially 90°.

2. The device according to claim 1 which includes winch means on said vehicle for raising and lowering said device from said boat loading position to a boat storage position on the upper roof surface of said vehicle, and vice-versa.

3. The device according to claim 1 which includes adjustable jack means on said main frame for adjusting the position of said other end of said main frame with the ground when said main frame is in said boat loading position, thereby facilitating the engagement of said boat clamping frame with the associated boat.

4. The device according to claim 2 which includes adjustable jack means on said main frame for adjusting the position of said other end of said main frame with the ground when said main frame is in said boat loading position, thereby facilitating the engagement of said boat clamping frame with the associated boat.

5. The device according to claim 1 in which said boat clamping frame includes a substantially rectangular frame and means on said frame to detachably engage the gunwales of the associated boat, said last means including at least one fixed gunwale engaging clamp engaging with one gunwale of said boat and at least one adjustable gunwale engaging clamp engageable with the other gunwale of said boat thereby clamping said boat by gunwales thereof to said clamping frame.

6. The device according to claim 2 in which said boat clamping frame includes a substantially rectangular frame and means on said frame to detachably engage the gunwales of the associated boat, said last means including at least one fixed gunwale engaging clamp engaging with one gunwale of said boat and at least one adjustable gunwale engaging clamp engageable with the other gunwale of said boat thereby clamping said boat by gunwales thereof to said clamping frame.

7. The device according to claim 3 in which said boat clamping frame includes a substantially rectangular frame and means on said frame to detachably engage the gunwales of the associated boat, said last means including at least one fixed gunwale engaging clamp engaging with one gunwale of said boat and at least one adjustable gunwale engaging clamp engageable with the other gunwale of said boat thereby clamping said boat by gunwales thereof to said clamping frame.

8. The device according to claim 4 in which said boat clamping frame includes a substantially rectangular frame and means on said frame to detachably engage the gunwales of the associated boat, said last means including at least one fixed gunwale engaging clamp engaging with the gunwale of said boat and at least one adjustable gunwale engaging clamp engageable with the other gunwale of said boat thereby clamping said boat by gunwales thereof to said clamping frame.

* * * * *